United States Patent Office 3,558,625
Patented Jan. 26, 1971

---

3,558,625
PYRAZINECARBOXYALDEHYDES AND METHOD FOR THEIR PREPARATION
Roger J. Tull, Metuchen, Edward W. Tristram, Cranford, and Edward J. J. Grabowski, Iselin, N.J., assignors to Merck & Co., Inc., Rahway, N.J., a corporation of New Jersey
No Drawing. Filed Oct. 31, 1968, Ser. No. 772,397
Int. Cl. C07d 51/76
U.S. Cl. 260—250
6 Claims

ABSTRACT OF THE DISCLOSURE

A process is described for the preparation of novel 5-lower alkoxypyrazinecarboxaldehydes which have utility as fungistatic agents. The process comprises treating 2-trichloromethylpyrazine with an alkali metal alkoxide in the corresponding alkanol or other inert solvent.

---

This invention relates to novel pyrazinecarboxaldehydes and a process for their preparation. More specifically it relates to novel 5-lower alkoxy-2-pyrazinecarboxaldehydes of structure II and the process described by the following reaction scheme:

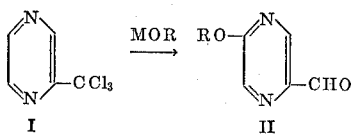

wherein R represents lower alkyl of from 1 to about 3 carbon atoms, such as methyl, ethyl, propyl or the like, and M is an alkali metal such as sodium or potassium.

The novel compounds of this invention demonstrate valuable broad fungistatic activity showing total inhibition of growth at concentrations as low as 40 p.p.m. against such organisms as *Aspergillus niger, Pullularia pullulans, Pennicilium luteum,* and *Rhizoctonia solani.*

Compounds such as the novel compounds of this invention with fungistatic activity of this order are valuable agents for the control of fungal growth by incorporation at a level of 40–1000 p.p.m. into the products and substance of various industries such as paper, adhesives, leather, textiles, laundry, wood (including lumber, wood chips and wood pulp), paints, plastics, exterior coatings, and for use in agriculture, particularly in the growing of cereal grains, for the prevention of damping off and/or stem rot of the host plant principally by pre-germination seed treatment.

The novel process of this invention according to the above equation consists of heating a solution of 2-trichloromethylpyrazine, I, and an alkali metal alkoxide such as sodium or potassium methoxide, ethoxide or propoxide in the corresponding lower alkanol or any other organic solvent in which the alkali metal alkoxide and the 2-trichloromethylpyrazine are soluble, such as dimethoxyethane or diethylene glycol dimethyl ether at a temperature between about 64° and about 100° C. for from about 3 to about 10 hours. After evaporation of the solvent, the ether soluble material is treated with a dilute mineral acid such as hydrochloric, hydrobromic or sulfuric acid, in a lower alkanol, for a short time, and diluted largely with water. After filtration the filtrate is extracted with chloroform or other solvent known to have similar solvent properties. Removal of the solvent provides the novel product of this invention.

The trichloromethylpyrazine used as starting material in the process of this invention is a new compound the preparation of which is described in the following examples.

EXAMPLE 1

5-methoxy-2-pyrazinecarboxaldehyde

Step A: Preparation of 2-(trichloromethyl)pyrazine.—Chlorine is passed through a solution of 77.0 g. (0.819 mole) of 2 methylpyrazine in 750 ml. of glacial acetic acid, maintained at 100° C. for 4 hours at a rate of 15 mmole/min. The brown oil formed after the addition of 2 liters of water is extracted with 2 liters of ether. Removal of the ether at reduced pressure leaves a brown oil which is recrystallized from 1 liter of petroleum ether to yield 60.5 g. (44% of theory) of 2-(trichloromethyl)pyrazine; M.P. 38–39° C.

*Analysis.*—Calcd. for $C_5H_3Cl_3N_2$ (percent): C, 30.4; H, 1.5; Cl, 53.9; N, 14.2. Found (percent): C, 30.3; H, 1.3; Cl, 53.8; N, 13.9.

Step B: Preparation of 5-methoxy-2-pyrazinecarboxaldehyde.—To a solution of 10.9 g. (55.0 mmole) of 2-trichloromethylpyrazine in 125 ml. of methanol is added a solution of 11.0 g. (200 mmole) of sodium methoxide in 125 ml. of methanol over a 5 minute period. The reaction mixture is refluxed for 6 hours. The methanol is removed at reduced pressure and the residue is slurried with 100 ml. of ether. Filtration and concentration at reduced pressure leaves 10.0 g. of a yellow oil. This is dissolved in 30 ml. of methanol and 10 ml. of 2.5 N hydrochloric acid and stirred for 30 minutes at room temperature. Addition to 100 ml. of water produces a white precipitate which is filtered. The aqueous filtrate is then extracted with 150 ml. of chloroform which is dried over anhydrous sodium sulfate, filtered and concentrated at reduced pressure. The resulting oil is recrystallized from 40 ml. of petroleum ether to afford 3.0 g. (22 mmole, 40%) of 5-methoxy-2-pyrazinecarboxaldehyde; M.P. 69–71° C.

*Analysis.*—Calcd. for $C_6H_6N_2O_2$ (percent): C, 52.2; H, 4.4. Found (percent): C, 52.1; H, 4.2.

Employing the procedure of Example 1, Step B, but substituting for the sodium methoxide and methanol used therein equivalent quantities of the alkali metal alkoxides and solvents described in Table I, there are produced the 5-alkoxy-2-pyrazinecarboxaldehydes also described in Table I.

TABLE I

| M | R | Solvent |
|---|---|---|
| Na | $C_2H_5$— | $C_2H_5OH$ |
| K | n-$C_3H_7$— | n-$C_3H_7OH$ |
| K | $CH_3$— | $CH_3OCH_2CH_2OCH_3$ |
| Na | n-$C_3H_7$— | $(CH_3OCH_2CH_2)_2O$ |

What is claimed is:
1. A process for the preparation of 5-lower alkoxy-2-pyrazinecarboxaldehyde of structure

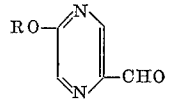

wherein R is lower alkyl, which comprises the treatment of 2-(trichloromethyl)pyrazine, with an alkali metal-lower alkoxide of structure MOR, wherein M is a member selected from the group consisting of sodium and potassium in a solvent in which the alkali metal-lower alkoxide and 2-(trichloromethyl)pyrazine are soluble at a temperature between about 64° and 100° C.

2. A process for the preparation of 5-methoxy-2-pyrazinecarboxaldehyde, which comprises the reaction of 2-trichloromethylpyrazine with sodium methoxide in methanol at reflux temperature.

3. A process for the preparation of 5-ethoxy-2-pyrazinecarboxaldehyde, which comprises the reaction of 2-(trichloromethyl)pyrazine with sodium ethoxide in ethanol at the reflux temperature.

4. 5-lower alkoxy-2-pyrazinecarboxaldehyde, of structure

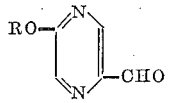

wherein R is lower alkyl.

5. 5-methoxy-2-pyrazinecarboxaldehyde.
6. 5-ethoxy-2-pyrazinecarboxaldehyde.

References Cited
UNITED STATES PATENTS 3,098,069    7/1963    Camerino et al. _____ 260—250

NICHOLAS S. RIZZO, Primary Examiner

U.S. Cl. X.R.

260—45.8; 424—250